United States Patent [19]
Kakiuchi et al.

[11] Patent Number: 5,588,469
[45] Date of Patent: Dec. 31, 1996

[54] HOSE FOR AUTOMOTIVE FUEL PIPING

[75] Inventors: Daisuke Kakiuchi, Okayama; Yasumichi Ogawa, Kurashiki; Hifumi Yasumatsu, Okayama-ken; Kazutaka Shiraga, Kurashiki, all of Japan

[73] Assignee: Marugo Rubber Industries, Ltd., Okayama-ken, Japan

[21] Appl. No.: 542,111

[22] Filed: Oct. 12, 1995

[30] Foreign Application Priority Data

Oct. 17, 1994 [JP] Japan .................................. 6-250784

[51] Int. Cl.⁶ .................................................. F16L 11/04
[52] U.S. Cl. .......................... 138/137; 138/125; 138/126; 138/141
[58] Field of Search ...................... 138/126, 125, 138/137, 140, 141, DIG. 3, DIG. 7; 428/36.2, 36.8, 36.91

[56] References Cited

U.S. PATENT DOCUMENTS

| | | | |
|---|---|---|---|
| 4,887,647 | 12/1989 | Igarashi et al. | 138/126 |
| 4,942,906 | 7/1990 | Igarashi et al. | 138/126 |
| 4,984,604 | 1/1991 | Nishimura | 138/126 |
| 4,998,564 | 3/1991 | Igarashi et al. | 138/126 |
| 5,093,166 | 3/1992 | Nishimura | 138/126 X |
| 5,284,184 | 2/1994 | Noone et al. | 138/126 X |
| 5,320,888 | 6/1994 | Stevens . | |
| 5,348,779 | 9/1994 | Igarashi | 138/126 X |

FOREIGN PATENT DOCUMENTS

| | | |
|---|---|---|
| 59-38896 | 9/1984 | Japan . |
| 60-33663 | 8/1985 | Japan . |
| 5-44874 | 2/1993 | Japan . |
| 5-214118 | 8/1993 | Japan . |
| 6-99548 | 4/1994 | Japan . |

*Primary Examiner*—Patrick Brinson
*Attorney, Agent, or Firm*—Keck, Mahin & Cate

[57] ABSTRACT

A hose for automotive fuel piping has an inner layer formed of a molding of a terpolymeric fluoro-resin prepared from tetrafluoroethylene, hexafluoropropylene and vinylidene fluoride, so that it can be provided with suitable flexibility. Both the vulcanization composition of an epichlorohydrin rubber or NBR/PVC blend to be disposed outside the inner layer and the vulcanization composition of an NBR rubber or fluororubber to be disposed inside the inner layer contain 1,8-diazablcylco(5.4.0)undecene-7 salts and organophosphonium salts. A satisfactory bonding strength can be attained merely by the vulcanlzation bonding without any surface treatment such as corona discharge on the surface of the inner layer fluororesin.

3 Claims, 1 Drawing Sheet

HOSE FOR AUTOMOTIVE FUEL PIPING

FIELD OF THE INVENTION

The present invention relates to a hose for automotive fuel piping.

BACKGROUND OF THE INVENTION

A hose for automotive fuel piping having a fluororesin layer as a gasoline barrier is now being highlighted in accordance with the strengthening of SHED (Sealed Housing for Evaporative Determinations) in the United States. Japanese Patent Laid-Open No. 5-44874/1993 discloses a hose structure in which a fluororesin having a low gasoline permeability, such as tetrafluoroethylene/ethylene copolymer or polytetrafluoroethylene, is used as an inner layer and an epichlorohydrin rubber as an outer layer. In the formation of this structure, the surface of the inner layer resin was treated by corona discharge or UV irradiation and bonded to the outer layer rubber with a thermosetting adhesive which is gasoline-resistant, flexible and thermally stable. Further, Japanese Patent Laid-Open No. 6-99548/1994 discloses a hose structure in which a fluororesin such as polyvinylidene fluoride or polychlorotri-fluoroethylene is used as an inner layer and a rubber elastomer such as nitrile/butadiene rubber or epichlorohydrin rubber as an outer layer. In this reference, there is no particular description on the bonding of the inner layer resin to the outer layer rubber. However, it is conceivable that, eventually, a modification to achieve a better bonding through surface treatment such as corona discharge cannot but be effected because no satisfactory bonding strength can be attained between the fluororesin and the rubber elastomer such as NBR rubber by the conventional vulcanization bonding.

Further, Japanese Patent Publication No. 59-38896/1984 discloses that, in a structure composed of a fluororubber which is a terpolymer of vinylidene fluoride, tetrafluoroethylene and hexafluoropropylene as an inner layer and an epichlorohydrin rubber as an outer layer, the incorporation of a divalent metal oxide or hydroxide, a fluorinated polyhydroxy compound and an organic compound containing a nitrogen or phosphorus atom in its molecule as common vulcanization system components remarkably improves the bonding between the layers having inherently a problem in lamination attributed to poor compatibility between the two types of rubbers and vulcanization systems different from each other.

Japanese Patent Publication No. 60-33663/1985 teaches the addition of a 1,8-diaza-bicylco(5.4.0)undecene-7 salt of a carboxylic acid to a structure composed of a fluoro-rubber as an inner layer and an epichlorohydrin rubber as an outer layer and Japanese Patent Publication No. 5-214118/1993 shows the interposition of a phosphonium salt between the rubber layers in the production of a laminate composed of the fluororubber layer and the other rubber layer.

All the above-mentioned fluororesins were hard and lacked flexibility, so that, when molded into hoses, the handling thereof was very difficult. Moreover, these hoses had a drawback in securing the sealing at the junctions where other pipes were inserted into the hoses. Further, surface treatment such as corona discharge over the entire inner surface of a long-hose-shaped fluororesin layer was so difficult that the formation of a rubber layer as an innermost layer which was desired for improving the sealing properties encountered difficulties.

SUMMARY OF THE INVENTION

In view of the above-mentioned drawbacks of the conventional items, an object of the present invention is to provide a hose for automotive fuel piping which not only has flexibility suitable for a hose but also ensures the attainment of bonding to a rubber layer at a satisfactory strength to provide a desired sealing effect merely by vulcanization bonding even without any surface treatment such as corona discharge when a desired rubber layer is disposed outside or inside a fluororesin layer.

The hose for automotive fuel piping according to the present invention comprises:

- an inner layer which is a molding of a terpolymeric fluororesin prepared from tetrafluoroethylene, hexafluoropropylene and vinylidene fluoride (hereinafter referred to as "F resin"),

- an outer layer which is a molding obtained by vulcanizing a vulcanization composition comprising an epichlorohydrin rubber (hereinafter -referred to as "ECO") or a blend of nitrile/butadiene rubber and polyvinyl chloride resin (hereinafter referred to as NBR/PVC) compounded with a 1,8-diazabicylco-(5.4.0)undecene-7 salt (hereinafter referred to as "D.B.U salt") and an organophosphonium salt, and

- an innermost layer which is a molding obtained by vulcanizing a vulcanization composition comprising a nitrile/butadiene rubber (NBR, NBR/PVC or hydrogenated NBR) or fluororubber compounded with a D.B.U salt and an organophosphonium salt,

- the above layers being firmly bonded to each other by vulcanization.

Although general fluororesins are so hard as to exhibit flexural modulus of from 7000 to 9000 Kgf/cm$^2$, the above F resin for use in the present is so soft as to exhibit a flexural modulus of from 2000 to 2800 Kgf/cm$^2$. Therefore, when the F resin is molded into a hose, the hose can possess desirable flexibility.

In the present invention, an ECO or NBR/PVC having excellent ozone resistance is disposed as an outer layer outside the inner layer formed of the above F resin, and a nitrile/butadiene rubber (the term "nitrile/butadiene rubber" as used in the present invention refers to not only NBR but also hydrogenated NBR and NBR/PVC) or fluororubber having excellent gasoline resistance is disposed as an innermost layer inside the inner layer. Both the vulcanization compositions for forming the outer layer and the innermost layer contain D.B.U salts and organophosphonium salts. This ensures the attainment of a desirable bonding strength by the conventional vulcanization without the necessity for subjecting the F resin to any special surface treatment.

With respect to the proportion of blending of the organophosphonium salt with the D.B.U salt, generally the phosphonium salt is blended in an amount of 0.2 to 5.0 phr while the D.B.U salt is blended in an amount of 0.5 to 6.0 phr, and preferably the phosphonium salt is blended in an amount of 1.0 to 2.0 phr while the D.B.U salt is blended in an amount of 2.0 to 4.0 phr. When the amounts of the organophosphonium salt and D.B.U salt are less, a poorer bonding strength results. On the other hand, when the above amounts are too large, a poor compression set results.

PREFERRED EMBODIMENTS OF THE INVENTION

Figure 1:
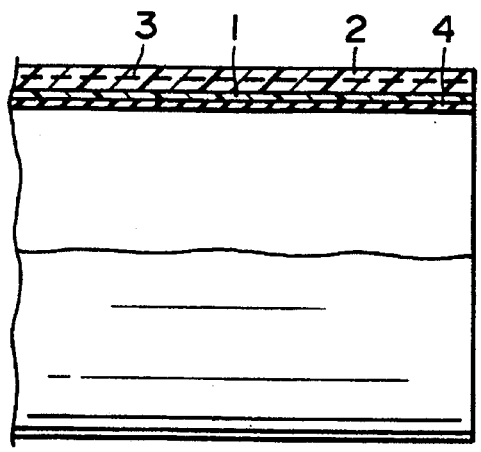
FIG. 1 is a partial sectional view of one form of the hose for automotive fuel piping according to the present invention.
Figure 2:
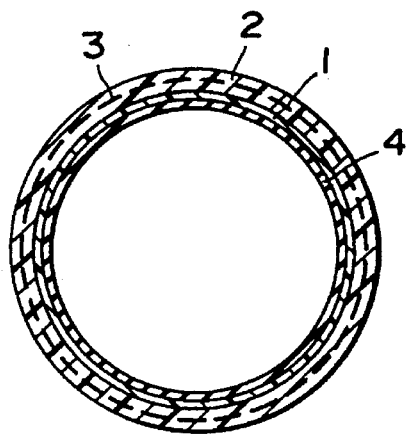
FIG. 2 is a sectional view of the hose shown in FIG. 1.

In the embodiment shown in FIGS. 1 and 2, the F resin, i.e., the terpolymer fluororesin prepared from tetrafluoroethylene, hexafluoropropylene and vinylidene fluoride which constitutes the inner layer 1 is commercially available from 3M under the tradename of THV.

Figure 3:
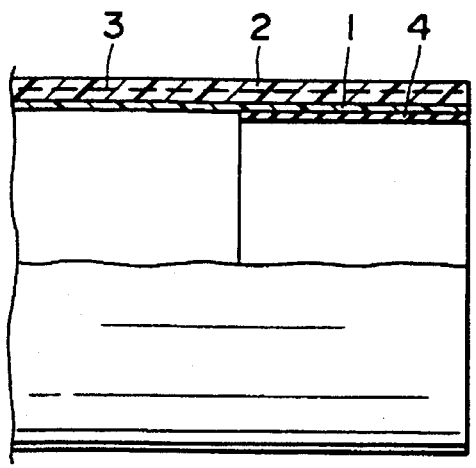
FIG. 3 is a partial sectional view of a hose according to another embodiment of the invention.

The outer layer 2 disposed outside the inner layer 1 was formed of ECO or NBR/PVC. The outer layer 2 may be provided with a reinforcing layer 3 of, for example, polyester fibers according to necessity. The innermost layer 4 disposed inside the inner layer 1 was formed of an NBR rubber or a fluororubber. The innermost layer 4 may be formed either over the entire inside surface of the hose (refer to FIG. 1) or only on those parts of the hose ends into which mating pipes are inserted (FIG. 3). According to necessity, a sealing lip (not shown) may be formed on the surface of the innermost layer 4 to thereby render the sealing at the junction with the mating pipe more secure.

D.B.U salt and an organophosphonium salt were added to each of the vulcanization compositions for forming the outer layer 2 and the innermost layer 4 to thereby permit the hoses shown in FIGS. 1 to 3 to be produced in accordance with the conventional hose manufacturing technology. Specifically, with respect to the ECO as the material for forming the outer layer 2, ECO (Epichlomer C produced by Daiso) was regularly blended with 50 phr of carbon, 15 phr of basic silica, 20 phr of plasticizer, 15 phr of Ca(OH)$_2$, 5 phr of stearic acid, 1 phr of MgO, 5 phr of Pb$_3$O$_4$, and 2 phr of urea type vulcanizing agent. With the use of this regular composition, a sheet of the fluororesin was interposed between a pair of unvulcanized rubber sheets (about 150 mm×150 mm with a thickness of 2–3 mm) and wound round an iron pipe of about 70 mm in outside diameter. Further, a polyester cloth (about 25 mm in width) was wound thereround, directly put in a steam chamber (160° C.), and heated for 20 min to thereby effect vulcanization. A test piece of 1 inch in width was taken from the vulcanized sheet. A 180° peeling test of the test piece at a rate of 50 mm/min showed that interfacial peeling occurred at a peel strength of about 0.8 Kgf/inch. However, the addition to the above composition of an organophosphonium salt (Dynamar FX-5166 produced by 3M and composed mainly of Allytributyl Phosphonium Chloride), a D.B.U salt (P-152 produced by Daiso) and a polyol in respective amounts of 0.2, 0.5 and 1.5 phr led to the occurrence of partial interfacial breakage at a peel strength as large as 10 Kgf/inch. Further, the addition to the above composition of the organophosphonium salt, D.B.U salt and polyol in respective amounts of 1.5, 3.0 and 1.5 phr led to the occurrence of rubber breakage at a peel strength still as large as at least 15 Kgf/inch. Nevertheless, not only did the increases of the amounts of the organophosphonium salt and D.B.U salt to 5.0 and 6.0 phr, respectively, bring about no change in the occurrence of rubber breakage at a peel strength of at least 15 Kgf/inch, but also the use thereof in excess caused the compression set to be worsened. Therefore, the optimum addition amount ranges from 1.0 to 2.0 with respect to the phosphonium salt and from 2.0 to 4.0 with respect to the D.B.U. salt.

Here, the D.B.U. salt described above intends to mean 1,8-diazabicylco(5.4.0)undecene-7 and its salt with weak acid and, from a viewpoint of handling, carbonate, long chain fatty acid, carboxylate, aromatic sulfonate or carboxylate, phenol salt, thiolic salt, etc. are favourably applicable. Typical examples are DBU-carbonate, DBU-stearate, DBU-naphthoate, DBU-P-hydroxy-benzoate, DBU-P-toluenesulfonate, etc.

The organophosphonium salt intends to mean a quaternary phosphonium salt which contains an alkyl group with 1 to 20 carbon atoms, and a quaternary phosphonium salt which contains an aromatic substituent group, such as tetrabutylphosphonium chloride, tetrabutylphosphonium bromide, tributyl(methoxypropyl)phosphonium chloride, benzyltriphenylphosphonium chloride, benzyltrioctylphosphonium chloride, triphenyl benzyl phosphonium chloride, tetraalkylphosphonium benzotriazol (tetrabutylphosphonium benzotriazole, trioctylethylphosphonium benzotriazol), etc.

With the use of the regular composition of NBR (JSR N220S produced by Japan Synthetic Rubber Co., Ltd.) blended with carbon, basic silica, Ca(OH)$_2$, plasticizer, zinc oxide, stearic acid, sulfur and peroxide (Kayacumyl D40C produced by Kayaku Akzo Corporation) in respective amounts of 40, 20, 15, 10, 5, 1, 0.5 and 7.0 phr for forming the innermost layer 4, interfacial peeling occurred at a peel strength of about 0.7 Kgf/inch. However, the addition to the above composition of the organophosphonium salt and the D.B.U salt in respective amounts of 0.2 and 0.2 phr led to the occurrence of partial interfacial peeling at a peel strength as large as 13 Kgf/inch. Further, the addition to the above composition of the phosphonium salt and the D.B.U salt in respective amounts of 1.5 and 3.0 phr led to the occurrence of rubber breakage at a peel strength still as large as at least 15 Kgf/inch. Hydrogenated NBR (Zetpol 1020 produced by Nippon Zeon Co., Ltd.) and NBR/PVC (DN502 produced by Nippon Zeon Co., Ltd.) were also studied, and the obtained results were substantially the same as those with the use of NBR. The optimum addition amount ranges from 1.0 to 3.0 phr with respect to the phosphonium salt and from 2.0 to 5.0 phr with respect to the D.B.U. salt.

With respect to fluororubber (TX348E produced by Nippon Zeon Co., Ltd.) for forming the innermost layer 4 as well, interfacial peeling occurred at a peel strength of about 1.3 Kgf/inch with the use of the regular composition of the fluororubber blended with carbon, Ca(OH)$_2$ and a polyol in respective amounts of 10, 6 and 2.5 phr. However, the addition to the above composition of the organophosphonium salt and the D.B.U salt in respective amounts of 0.2 and 0.5 phr led to the occurrence of partial interfacial breakage at a peel strength as large as 10 Kgf/inch. Further, the addition to the above composition of the organic phosphonium salt and the D.B.U salt in respective amounts of 1.5 and 3.0 phr led to the occurrence of rubber breakage at a peel strength still as large as at least 15 Kgf/inch. Nevertheless, the increase of the amount of each of the organic phosphonium salt and D.B.U salt to 5.0 phr, did not bring about any change in the occurrence of rubber breakage at a peel strength of at least 15 Kgf/inch.

The properties of bonding strength (peel strength) of the present invention are given in the following Table. In the Table, the term "modified" appended to the end of the notation indicating the material means that the above organophosphonium salt and D.B.U salt have been added to the material. "THV" is a tradename of the F resin commercially available from 3M. For ETFE (tetrafluoroethylene/ethylene copolymer), "LM 740" produced by Asahi Glass Co., Ltd. was used.

In the table, tetrafluoroethylene/ethylene copolymer was substituted for the F resin in Comparative Examples. With the use of the above copolymer, the addition of the organophosphonium salt and D.B.U salt was not effective in attaining satisfactory bonding.

|  | Rubber Material | Fluoro-resin | Bonding strength, peel strength Kgf/inch |
|---|---|---|---|
| EX. 1 | NBR modified | THV | at least 15 |
| EX. 2 | ECO modified | THV | at least 15 |
| EX. 3 | H-NBR modified | THV | at least 15 |
| EX. 4 | NBR/PVC modified | THV | at least 15 |
| EX. 5 | FKM modified | THV | at least 15 |
| Comp. Ex. 1 | NBR | THV | 0.7 surfaces not bonded |
| Comp. Ex. 2 | ECO | THV | 0.8 surfaces not bonded |
| Comp. Ex. 3 | H-NBR | THV | 0.5 surfaces not bonded |
| Comp. Ex. 4 | NBR/PVC | THV | 0.5 surfaces not bonded |
| Comp. Ex. 5 | FKM | THV | 0.3 surfaces not bonded |
| Comp. Ex. 6 | NBR | ETFE | 0.2 surfaces not bonded |
| Comp. Ex. 7 | ECO | ETFE | 0.2 surfaces not bonded |
| Comp. Ex. 8 | NBR modified | ETFE | 0.2 surfaces not bonded |
| Comp. Ex. 9 | ECO modified | ETFE | 0.2 surfaces not bonded |

Examples of producing method of the hose according to the present invention will be described as set forth below:

Production Example 1:

NBR rubber is extruded onto a mandrel of a resin (TPX, that is, methylpentene polymer) having an outer diameter. of 6 mm to provide a coating of about 0.5 mm thick. On the coating of the NBR rubber, THV (F resin) of about 0.2 mm thick is coated by extrusion at an extruder-head temperature of 250° to 300° C. After the resins described above are constantly coated and cooled, ECO rubber of about 1.5 mm thick is coated by extrusion. Then, the ECO rubber-coated resins are wound on a pan and vulcanized at 155° C. for about 30 minutes by a steam chamber oven, and then cut into a predetermined dimension. After cutting, the mandrel is pulled out to provide a final product. If necessary, a post vulcanization can be made at 150° C. for 1 to 3 hours by using a heat oven. If a curved hose is to be produced, the mandrel is pulled out after the coating of the ECO rubber is finished, and a metal mandrel of a predetermined curved configuration is inserted, followed by the vulcanization by means of the steam chamber as described above.

If desired, the innermost layer of NBR rubber can be substituted by hydrogenated NBR (that is, H-NBR).

Production Example 2:

NBR rubber of about 0.5 mm thick is extrusion-coated on an aluminum pipe of 37 mm in outer diameter. On the coating of the NBR rubber, THV of about 0.2 mm thick is coated by extrusion at an extruder-head temperature of 250° to 300° C. After the resins described above are constantly coated and cooled, ECO rubber of about 3.3 mm thick is coated by extrusion. Then the aluminum pipe is pulled out and a predetermined cutting is carried out and then the above described resins are inserted into a metal mandrel of a predetermined shape to provide vulcanization at 155° C. for about 30 minutes by a steam chamber. After the vulcanization, the produced hose is pulled out of the metal mandrel.

Production Example 3:

THV of about 0.2 mm thick is extrusion-coated on a thermoplastic elastomer mandrel of 38 mm in outer diameter and 27 mm in inner diameter. After THV resin is constantly coated and cooled, NBR/PVC rubber of 3.3 mm thick is extrusion-coated on the cooled resin. Then, thermoplastic elastomer mandrel is pulled out and a predetermined cutting is carried out. Then, the resins are inserted into a metal mandrel to be vulcanized at 155° C. for about 30 minutes. After vulcanization, the produced hose is taken out. On the inner surface of the opposite ends of the hose, unvulcanized NBR tubes having a thickness of 0.5 mm and a length of 35 mm are inserted. The ends of the hose are placed in predetermined molds, with the hose being placed in an inwardly and outwardly constrained condition, and vulcanized at 150° C. for about 15 min. to obtain a desired hose having NBR rubber coated on the inner ends thereof.

For electrostatic problems, conductive THV(ESD) which is an electrostatic dissipative compound and mixture of THV and electroconductive carbon and so forth can be used if desired. This provides an electric conductivity of $10^4$ Ω cm and satisfactorily meets with the automotive industrial requirement of, for example, $10^8$ Ω cm.

As described above, the hose for automotive fuel piping according to the present invention has an inner layer formed of a molding of a terpolymeric fluoro-resin prepared from tetrafluoroethylene, hexafluoropropylene and vinylidene fluoride, so that it can be provided with flexibility suitable for a hose.

Moreover, both the vulcanization composition of an epichlorohydrin rubber or NBR/PVC blend to be disposed outside the inner layer composed of the above F resin and the vulcanization composition of an NBR rubber or fluororubber to be disposed inside the inner layer contain 1,8-diazabicylco(5.4.0)undecene-7 salts and organophosphonium salts, so that a satisfactory bonding strength can be attained merely by the vulcanization bonding without the necessity for conducting any surface treatment such as corona discharge on the surface of the inner layer fluororesin.

What is claimed is:

1. A hose for automotive fuel piping comprising:

an inner layer of a terpolymeric fluororesin prepared from tetrafluoroethylene, hexafluoropropylene and vinylidene fluoride, an outer layer which is a molding obtained by vulcanizing a vulcanization composition comprising a member selected from the group consisting of an epichlorohydrin rubber and a NBR/PVC blend wherein each of the epichlorohydrin rubber and NBR/PVC blend is compounded with a 1,8-diazabicylco(5.4.0)undecene-7 salt and with an organophosphonium salt, and an innermost layer of a vulcanization composition comprising a member selected from the group consisting of an NBR rubber, NBR/PVC, hydrogenated NBR rubber and a fluororubber wherein each of the NBR rubber and fluororubber is compounded with a 1,8-diazabicylco(5.4.0)undecene-7 salt and with an organophosphonium salt, the above layers being firmly bonded to each other.

2. A hose for automotive fuel piping according to claim 1, wherein said organophosphonium salt is a quaternary phosphonium salt containing an alkyl group with 1 to 20 carbon atoms.

3. A hose for automotive fuel piping according to claim 1, wherein said organophosphonium salt comprises an aromatic substituent group.

* * * * *